(12) United States Patent
Kim

(10) Patent No.: US 8,668,057 B2
(45) Date of Patent: Mar. 11, 2014

(54) PARKING BRAKE

(75) Inventor: Yong Jeong Kim, Gyeonggi-do (KR)

(73) Assignee: Mando Corporation, Pyeongtaek-Si (KR)

( * ) Notice: Subject to any disclaimer, the term of this patent is extended or adjusted under 35 U.S.C. 154(b) by 163 days.

(21) Appl. No.: 13/105,545

(22) Filed: May 11, 2011

(65) Prior Publication Data

US 2011/0278106 A1 Nov. 17, 2011

(30) Foreign Application Priority Data

May 11, 2010 (KR) .................. 10-2010-0044077

(51) Int. Cl.
*F16D 55/08* (2006.01)
(52) U.S. Cl.
USPC ........................................ 188/72.9; 188/73.1
(58) Field of Classification Search
USPC ........... 188/72.9, 72.8, 71.1, 72.1, 72.7, 72.6, 188/73.1, 218 A
See application file for complete search history.

(56) References Cited

U.S. PATENT DOCUMENTS

| 5,788,024 | A | * | 8/1998 | Meyer | 188/72.7 |
| 6,264,010 | B1 | * | 7/2001 | Doll et al. | 188/72.8 |
| 6,651,784 | B1 | * | 11/2003 | Barbosa et al. | 188/71.9 |
| 2004/0245055 | A1 | * | 12/2004 | Gerard et al. | 188/72.6 |
| 2008/0135354 | A1 | | 6/2008 | Petri et al. | |
| 2009/0014257 | A1 | * | 1/2009 | Watada | 188/17 |

FOREIGN PATENT DOCUMENTS

| CN | 1920324 A | 2/2007 |
| JP | 2009-036332 A | 2/2009 |

OTHER PUBLICATIONS

Chinese Office Action issued in Chinese Patent Application No. CN 201110121254.5 dated Mar. 5, 2013.

* cited by examiner

*Primary Examiner* — Melanie Torres Williams
(74) *Attorney, Agent, or Firm* — McDermott Will & Emery LLP

(57) ABSTRACT

Disclosed is a disk type parking brake employing a ball-in-ramp type actuator. The parking brake improves a structure of a sealing member installed around a shaft between a caliper housing and a lever member to enhance the braking performance.

5 Claims, 2 Drawing Sheets

PARKING BRAKE

This application claims the benefit of Korean Patent Application No. 10-2010-0044077 filed on May 11, 2010, in the Korean Intellectual Property Office, the disclosure of which is incorporated herein by reference.

BACKGROUND

1. Field

The disclosure relates to a parking brake for a vehicle. More particularly, the disclosure relates to a parking brake for a ball-in-ramp brake caliper type parking brake for a vehicle.

2. Description of the Related Art

In general, brakes for a vehicle are adapted to decelerate or stop a running vehicle, and include a drum brake and a disk brake. Also, parking brakes for keeping a vehicle stopped during parking of the vehicle generally include a drum type parking brake integrally installed in a drum brake and a disk type parking brake integrally installed in a disk brake. Such a parking brake is connected to a parking cable for operating the parking brake, and the parking cable is connected to a parking lever directly manipulated by a driver or a cable adjusting unit operated by an electric motor unit in such a manner that the parking cable can be operated manually or automatically.

In the case of the disk type parking brake, disk pads are attached on opposite side surfaces of a disk, which is rotated together with a wheel of a vehicle, to generate a braking force.

A general disk type parking brake includes a disk rotated together with a wheel of a vehicle, inner and outer disk pads installed on inner and outer sides of the disk, a caliper housing for operating the inner and outer disk pads, a piston installed in the caliper housing, a carrier movably supporting the caliper housing, and an actuator for actuating the piston.

The caliper housing is slidably installed in the carrier fixed to a knuckle of a body of the vehicle to be located on one side of an outer periphery of the disk. A cylinder is provided in the caliper housing and the piston is reciprocated in the cylinder. The piston moves forward within the cylinder to tightly press the inner disk pad to the disk.

The actuator is connected to a parking cable, and presses the piston toward the disk if the parking cable is operated.

Such actuators include a cam-strut type actuator using a cam rotated by operation of a parking cable and a strut installed between the cam and a piston, and a ball-in-ramp type actuator having a fixed ramp plate fixed to the interior of a caliper housing, a rotary ramp plate rotated by operation of a parking cable connected to a lever member, balls installed between the fixed ramp plate and the rotary ramp plate, and a push rod located adjacent to the rotary ramp plate to push a piston.

Meanwhile, in the ball-in-ramp type actuator, a shaft extending to the outside of the caliper housing is connected to the rotary ramp plate and the lever member is coupled to the shaft to rotate the rotary ramp plate, in which a sealing member is installed at a circumference of the shaft to seal a portion between the caliper housing and the lever member.

However, the sealing member installed at a circumference of the shaft between the caliper housing and the lever member is twisted by the friction between the lever member and the shaft when the lever member and the shaft are rotated during a braking operation, thereby causing a contact portion between the lever member and the shaft to get loose and deteriorating sealing efficiency. Thus, moisture and foreign substances cannot be effectively prevented from penetrating the interior of the caliper housing or the shaft. Accordingly, the parking brake according to the related art causes stains on a shaft portion of the rotary ramp plate due to the penetration of moisture and foreign substances, so that the braking performance is deteriorated.

SUMMARY

Accordingly, it is an aspect of the disclosure to provide a disk type parking brake employing a ball-in-ramp type actuator that improves a structure of a sealing member installed around a shaft between a caliper housing and a lever member to enhance its braking performance.

The foregoing and/or other aspects of the disclosure are achieved by providing a parking brake including a disk rotated together with a wheel of a vehicle, inner and outer disk pads reciprocating in a carrier coupled to a body of the vehicle and attached to inner and outer peripheral surfaces of the disk, a caliper housing slidably installed in the carrier to operate the outer disk pad and provided therein with a piston which reciprocates to operate the inner disk pad, an actuator installed within the caliper housing to operate the piston and having a shaft protruding to a rear side of the caliper housing through a rear hole formed at the rear side of the caliper housing, a lever member coupled to the shaft outside the caliper housing to connect the actuator to a parking cable, and a sealing member installed around the shaft between the caliper housing and the lever member, wherein the sealing member includes a housing coupling portion coupled to an inner periphery of the rear hole, a support rib supported by an outer surface of the caliper housing around the rear hole, a shaft support portion attached to a surface of the shaft between the caliper housing and the lever member, and a lever member support portion adhering to a surface of the lever member.

According to the disclosure, the actuator includes a fixed ramp plate fixedly installed in a chamber formed within the caliper housing and having a plurality of ramps, a rotary ramp plate having a plurality of ramps corresponding to the ramps of the fixed ramp plate and rotated through the shaft by the lever member, a plurality of balls provided among the ramps and moving the rotary ramp plate forward during rotation of the rotary ramp plate, and a push rod pushed during the forward movement of the rotary ramp plate to push the piston.

According to the disclosure, the sealing member further includes a connecting portion connecting the shaft support portion and the lever member support portion while being spaced apart from the shaft.

According to the disclosure, a first resilient force guide groove is formed on a contact surface of the lever member support portion such that the lever member support portion resiliently supports a surface of the lever member and a second resilient force guide groove is formed on a contact portion of the shaft support portion such that the shaft support portion resiliently support a surface of the shaft.

According to the disclosure, a grease filling groove for filling grease is formed on a contact surface of the lever member support portion making contact with a surface of the lever member.

As described above, according to one aspect of the disclosure, in the parking brake, a sealing member integrally formed with a support rib, a shaft support portion, and a lever member support portion can effectively seal a space between a sealing member and a caliper housing, a space between the sealing member and a shaft and a space between the sealing member and a lever member.

Therefore, the parking brake can prevent moisture and foreign substances from penetrating the interior of the caliper housing and the shaft. Accordingly, the parking brake can effectively prevent the actuator including the shaft from being corroded by moisture and foreign substances, thereby ensuring the braking performance.

BRIEF DESCRIPTION OF THE DRAWINGS

These and/or other aspects and advantages of the disclosure will become apparent and more readily appreciated from the following description of the embodiments, taken in conjunction with the accompanying drawings of which.

DETAILED DESCRIPTION OF THE EXEMPLARY EMBODIMENTS

A structure of a parking brake for a vehicle according to an exemplary embodiment of the disclosure will be described in detail with reference to the accompanying drawings.

Figure 1:
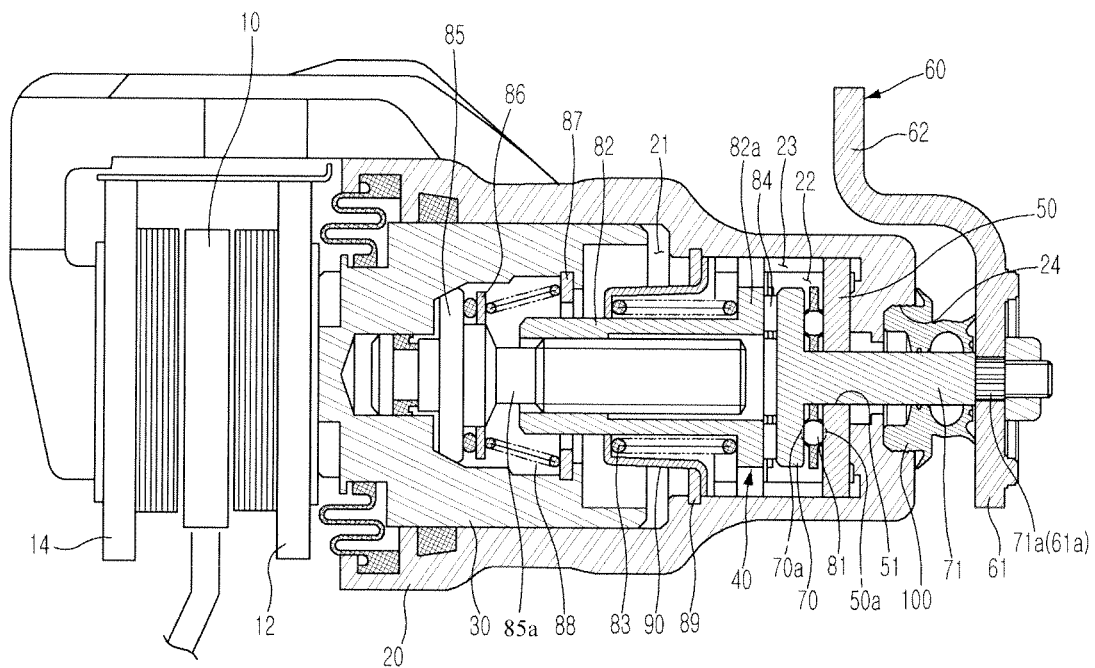
FIG. 1 is a sectional view schematically showing a parking brake according to an exemplary embodiment of the disclosure.
Figure 2:
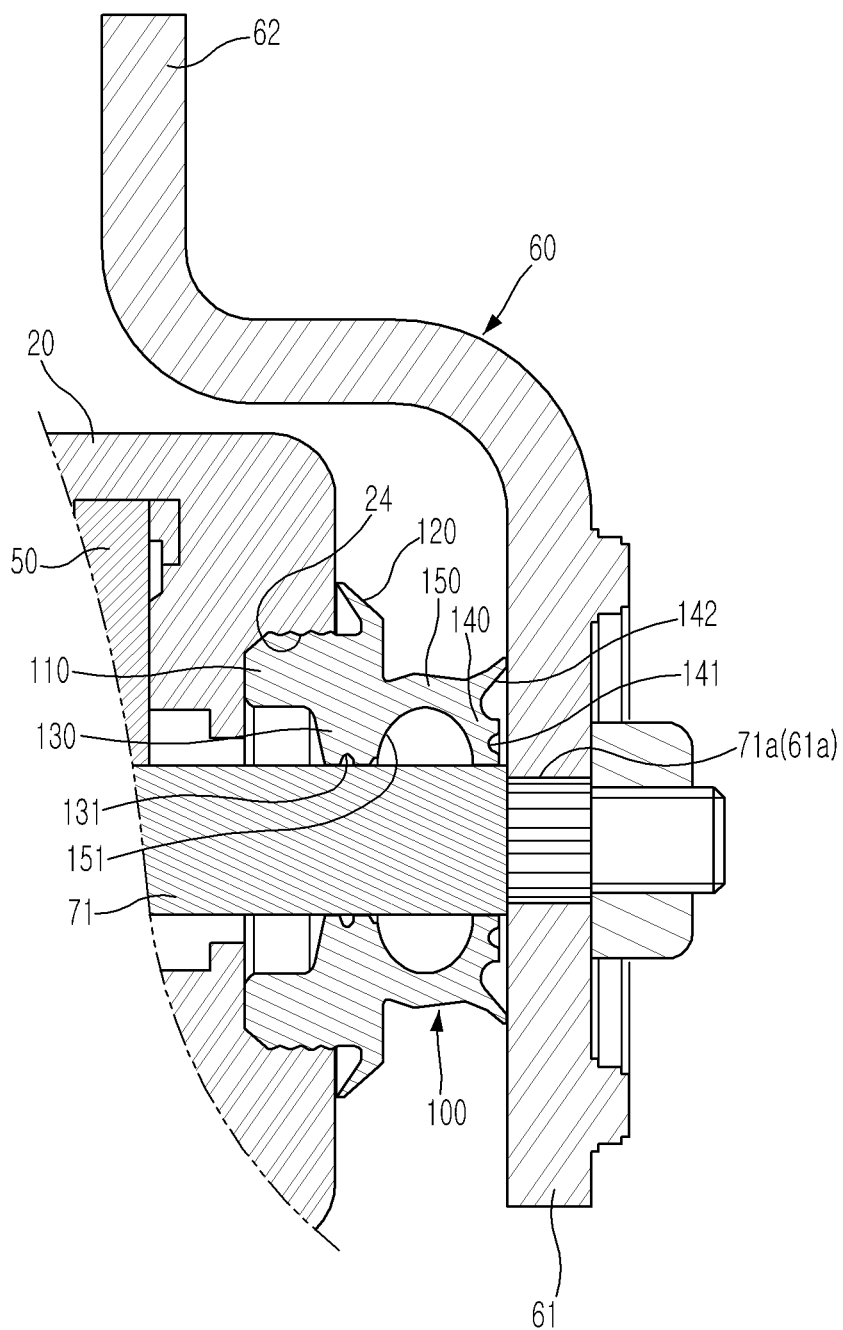
FIG. 2 is a sectional view showing a main portion of FIG. 1, wherein a structure of a sealing member is illustrated in detail.

As shown in FIGS. 1 and 2, the parking brake for a vehicle according to the embodiment of the disclosure includes a disk 10 rotated together with a wheel of the vehicle, inner and outer disk pads 12 and 14 movably installed in a carrier (not shown) coupled to a body of the vehicle to be attached on inner and outer surfaces of the disk 10, a caliper housing 20 slidably installed in the carrier (not shown) to operate the inner disk pad 12, a piston 30 reciprocating in the caliper housing 20, and an actuator 40 installed in the housing 20 to operate the piston 30.

The caliper housing 20 is slidably installed in the carrier (not shown) through a pair of guide rods (not shown). A cylinder 21 accommodating the piston 30 and a chamber 22 within which the actuator 40 is installed are provided within the caliper housing 20.

The cylinder 21 is formed at a front side of the caliper housing 20 to be opened toward the inner disk pad 12. The chamber 22 is formed at a rear side of the caliper housing 20 adjacent to the cylinder 21.

A pair of guide grooves 23 is formed at upper and lower sides of the chamber 22. The guide grooves 23 are formed at upper and lower portions of the inner peripheral surface of the caliper housing 20 to face each other in a lengthwise direction of the chamber 22, i.e. in a direction parallel to a movement direction of a push rod 82 to be described below. The longitudinal sections of the guide grooves 23 are semicircular.

Although not shown in the drawings, a hydraulic line connecting a master cylinder and the cylinder 21 is installed on one side of the caliper housing 20 so that a hydraulic pressure generated in the master cylinder can push the piston 30.

The actuator 40 is installed within the chamber 22 of the caliper housing 20 to be connected to the parking cable. The actuator 40 pushes the piston 20 toward the inner disk pad 12 in conjunction with the parking cable.

The actuator 40 includes a fixed ramp plate 50 fixed to the chamber 22, a rotary ramp plate 70 to which a lever member 60 connected to the parking cable is coupled, a plurality of balls 81 interposed between the fixed ramp plate 50 and the rotary ramp plate 70, a push rod 82 pushed by the rotary ramp plate 70 to press the piston 30, and a return spring 83 returning the push rod 82 to its original position.

The fixed ramp plate 50 is fixed to and installed at a rear side of the chamber 22. A through-hole 51 is formed at a central portion of the fixed ramp plate 50, and three first ramps 50a are provided around the through-hole 51 to be space apart from each other by a certain interval. In each of the first ramps 50a, its width and depth becomes smaller as it goes from the center thereof toward opposite ends thereof.

The rotary ramp plate 70 is movably installed within the chamber 22 to face the fixed ramp plate 50. A shaft 71 extends from a central portion of the rotary ramp plate 70. The shaft 71 protrudes to the rear side of the caliper housing 20 through the through-hole 51 of the fixed ramp plate 50 and an opened rear hole 24 of the caliper housing 20.

Three second ramps 70a corresponding to the first ramps 50a of the fixed ramp plate 50, respectively, are provided on one side surface of the rotary ramp plate 70. Similar to the first ramps 50a, the width and depth of the second ramps 70a become smaller as it goes from the center thereof toward opposite ends thereof. The three balls 81 are interposed between the fixed ramp plate 50 and the rotary ramp plate 70 to be inserted into the first ramp 50a and the second ramps 70a corresponding to them respectively.

The center portion of the push rod 82 is hollowed, and a female screw thread is formed on an inner peripheral surface of the push rod 82. A flange 82a expanding toward an inner peripheral surface of the caliper housing 20 is formed at an end of the push rod 82 adjacent to the rotary ramp plate 70.

A thrust bearing 84 is interposed between the flange 82a and the rotary ramp plate 70, and an adjustor 85a is screw-coupled to the interior of the push rod 82.

A male screw thread corresponding to the female screw thread of the push rod 82 is formed on an outer peripheral surface of the adjustor 85a inserted into the push rod 82, and a pusher 85 contacting an inner peripheral surface of the piston 30 is provided at one end of the adjustor 85a. A washer 86 is provided on the rear side of the pusher 85, and an adjusting spring 88 is interposed between the washer 86 and a fixing ring 87 coupled to one side of an outer peripheral surface of the push rod 82.

The return spring 83 is installed between the flange 82 and a cage 90 fixed to and installed at one side of the chamber 22 of the caliper housing 20 by a snap ring 89. The return spring 83 returns the push rod 82 which has been moved forward by the rotary ramp plate 70 to its original position if an external force applied to the lever member 60 is released.

The shaft 71 protruding to the outside of the caliper housing 20 is coupled to the lever member 60 and is connected to the parking cable (not shown). A spline 71a is formed around one side of the shaft 71 protruding to the outside of the caliper housing 20, and the lever member 60 includes a rotary body 61 having spline holes 61a at a central portion thereof such that one side of the shaft 71 close to the spline 71a inserted into and coupled to it and an extension 62 bent from one side of the rotary body 61 to extend for connection with the parking cable. Thus, the rotary ramp plate 70 is rotated within the chamber 22 through the shaft 71 rotated according to the rotation of the lever member 60.

Meanwhile, a sealing member 100 for preventing moisture and foreign substances from penetrating the interior of the caliper housing 20 and the shaft 71 is installed around the shaft 71 between the caliper housing 20 and the lever member 60. The sealing member is tub-shaped and is formed of a rubber to be easily deformed resiliently.

As illustrated in FIG. 2, the sealing member 100 includes a housing coupling portion 110 coupled to an inner periphery of the rear hole 24, a support rib 120 an end of which is supported by an outer surface of the caliper housing 20 around the rear hole 24, a shaft support portion 130 attached to a surface of the shaft 71 between the caliper housing 20 and the lever member 60, and a lever member support portion 140 attached to a surface of the lever member 60.

The sealing member 100 may be integrally fixed to the caliper housing 20 when formation of the caliper housing 20 by inserting the housing coupling portion 110 into a mold for forming the caliper housing 20. The fixed structure of the sealing member 100 inserted into the mold of the caliper housing 20 also aims to improve a sealing effect between the caliper housing 20 and the sealing member 100.

The support rib 120 extends from the housing coupling portion 110 to a surface of the caliper housing 20 around the rear hole 24 to resiliently support a surface of the caliper housing 20 with its end. Thus, the support rib 120 prevents moisture and foreign substances from penetrating between the caliper housing 20 and the sealing member 100.

In the sealing member 100, a connecting portion 150 connecting the shaft support portion 130 and the lever member support portion 140 is formed between the shaft support portion 130 and the lever member support portion 140. When the sealing member 100 is pressed between the caliper housing 20 and the lever member 60, the connecting portion 150 is preferably spaced apart from a surface of the shaft 71 to guide a flexible operation of the sealing member 100. The reference numeral 151 of the sealing member 100 indicates a spacing groove for spacing the connecting portion 150 from the shaft 71.

A first resilient force guide groove 141 is formed on a contact surface of the lever member support portion 140 contacting a surface of the lever member 60 to resiliently support a surface of the lever member 60, and a second resilient force guide groove 131 is formed on a contact surface of the shaft support portion 130 contacting a surface of the shaft 71 so that the shaft support portion 130 resiliently supports a surface of the shaft 70.

Thus, even when an excessive frictional force is applied between the lever member 60 and the lever member support portion 140 during rotation of the lever member 60, the lever member support portion 140 remains resiliently supported on a surface of the lever member 60 through the first resilient guide groove 141, effectively preventing moisture and foreign substances from penetrating toward the shaft 71 between the lever member 60 and the sealing member 100. The inner side of the lever member support portion 140 is preferably supported by the shaft 71.

When an excessive frictional force is applied between the shaft 71 and the shaft support portion 130 during rotation of the shaft 71, the shaft support portion 130 also remains resiliently supported by a surface of the shaft 71 through the second resilient force guide groove 131, effectively preventing moisture and foreign substances from penetrating between the shaft 71 and the sealing member 100.

A grease filling groove 142 for filling grease is formed on a contact surface of the lever member support portion 140 contacting a surface of the lever member 60 is formed outside the first resilient force guide groove 141, in which case if grease is filled in the grease filling groove 142, a frictional force generated between a surface of the lever member 60 and the lever member support portion 140 during rotation of the lever member 60 further improves a sealing effect between the lever member 60 and the sealing member 100 while being lowered by grease.

The first and second resilient force guide grooves 141 and 131 and the grease filling groove 142 are continuously formed circumferentially.

In a state where the above-described sealing member 100 is installed around the shaft 71 between the caliper housing 20 and the lever member 60, both a space between the sealing member 100 and the caliper housing 20 and a space between the sealing member 100, and the shaft 71 and the lever member 60 are effectively sealed during a braking operation of the parking brake to effectively prevent moisture and foreign substance from penetrating the interior of the caliper housing 20 or the shaft 71.

Hereinafter, an operation of the parking brake according to the embodiment of the present invention will be described in detail.

If a driver pulls the parking cable, the lever member 60 connected to the parking cable and the rotary ramp plate 70 are simultaneously rotated. Then, the positions of the second ramps 70a are changed such that the balls 81 interposed between the fixed ramp plate 50 and the rotary ramp plate 70 are located near the second ramps 70a, with the rotary ramp plate 70 moving toward the piston 30.

The pushing force generated by the movement of the rotary ramp plate 70 is transmitted to the flange 82a of the push rod 82 through the thrust bearing 84 with the push rod 82 being pushed forward. If the push rod 82 is pushed forward, the adjustor 85a coupled to it moves forward to push the piston 30 toward the disk 10.

If the piston 30 moves forward, the inner disk pad 12 is pushed and attached to an inner surface of the disk 10. If the inner disk pad 12 is attached to the disk 10, the caliper housing 20 is pushed in an opposite direction due to a reaction generated by the pressing force of the piston 30. Then, a front end of the caliper housing 20 pulls the outer disk pad 14 toward the disk 10 and the disk pad 14 is attached to an outer surface of the disk 10, generating a braking force.

If the external force applied to the parking cable is released, the lever member 60 returns to its original state and the rotary ramp plate 70 returns to its original position, in which case the push rod 82 also returns to its original position due to the resilient force of the return spring 83. At the same time, the piston 30 retreats rearward and the inner and outer disk pads 12 and 14 are separated from the disk 10, removing the braking force of the disk 10.

In the braking operation, the sealing member 100 integrally having the support rib 120, the shaft support portion 130, and the lever member support portion 140 effectively seals both a space between the sealing member 100 and the caliper housing 20 and a space between the sealing member 100, and the shaft 71 and the lever member 60 to prevent moisture and foreign substances from penetrating the interior of the caliper housing 20 and the shaft 71. Accordingly, the parking brake according to the embodiment of the present invention effectively prevents the actuator 40 including the shaft 71 from being corroded by moisture and foreign substances, securing its braking performance.

Although an embodiment of the disclosure has been shown and described, it would be appreciated by those skilled in the art that changes may be made in these embodiments without departing from the principles and spirit of the disclosure, the scope of which is defined in the claims and their equivalents.

What is claimed is:
1. A parking brake, comprising:
a disk rotated together with a wheel of a vehicle;
inner and outer disk pads reciprocating in a carrier coupled to a body of the vehicle and attached to inner and outer peripheral surfaces of the disk;
a caliper housing slidably installed in the carrier to operate the outer disk pad and provided therein with a piston which reciprocates to operate the inner disk pad;

an actuator installed within the caliper housing to operate the piston and having a shaft protruding to a rear side of the caliper housing through a rear hole formed at the rear side of the caliper housing;

a lever member coupled to the shaft outside the caliper housing to connect the actuator to a parking cable; and a sealing member installed around the shaft between the caliper housing and the lever member, wherein the sealing member integrally includes a housing coupling portion coupled to an inner periphery of the rear hole, a support rib supported by an outer surface of the caliper housing around the rear hole, a shaft support portion attached to a surface of the shaft between the caliper housing and the lever member, a connecting portion having a spacing groove for spacing the connecting portion from the shaft, and a lever member support portion adhering to a surface of the lever member and having a first resilient force guide groove formed on a contact surface of the lever member support portion such that the lever member support portion resiliently supports the surface of the lever member.

2. The parking brake of claim 1, wherein the actuator includes a fixed ramp plate fixedly installed in a chamber formed within the caliper housing and having a plurality of ramps, a rotary ramp plate having a plurality of ramps corresponding to the ramps of the fixed ramp plate and rotated through the shaft by the lever member, a plurality of balls provided among the ramps and moving the rotary ramp plate forward during rotation of the rotary ramp plate, and a push rod pushed during the forward movement of the rotary ramp plate to push the piston.

3. The parking brake of claim 2, wherein the sealing member further includes the connecting portion connecting the shaft support portion and the lever member support portion while being spaced apart from the shaft.

4. The parking brake of claim 1, wherein a second resilient force guide groove is formed on a contact portion of the shaft support portion such that the shaft support portion resiliently support the surface of the shaft.

5. The parking brake of claim 2, wherein a grease filling groove for filling grease is formed on the contact surface of the lever member support portion making contact with the surface of the lever member.

* * * * *